United States Patent Office 3,453,294
Patented July 1, 1969

3,453,294
1,5(AND 1,8)-DIHYDROXY-8(AND 5)-NITRO-4-NITROANILINO-ANTHRAQUINONES
Argento Crotti, Cogliate, Milan, Italy, assignor to Aziende Colori Nazionali Affini-Acna S.p.A., Milan, Italy
No Drawing. Continuation of application Ser. No. 283,524, May 27 1963. This application June 12, 1968, Ser. No. 744,599
Claims priority, application Italy, May 30, 1962, 10,699/62
Int. Cl. C09b 1/50
U.S. Cl. 260—380      2 Claims

ABSTRACT OF THE DISCLOSURE

Dyestuffs having the formula:

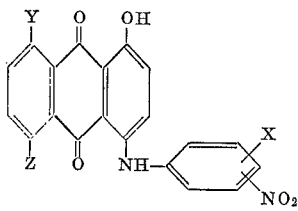

wherein X is selected from the group consisting of hydrogen and —$NO_2$, and Y and Z, each being different from the other, and selected from the group consisting of —OH and —$NO_2$; have been found to be particularly suitable for dyeing polyester materials.

---

This application is a continuation of my copending application Ser. No. 283,524, filed May 27, 1963, now abondoned.

The present invention relates to a new class of dyestuffs suitable for dyeing various materials and particularly for dyeing polyester materials. The invention further relates to a novel dyeing process.

I have surprisingly found that compounds of the general formula

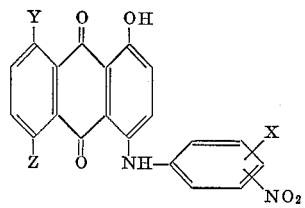

wherein X is selected from the group consisting of hydrogen and —$NO_2$, and wherein Y and Z are different from one another and are each selected from the group consisting of —OH and —$NO_2$, dye, preferably under pressure at a temperature between 110° and 130° C., polyester, particularly polyethylene terephthalate, materials, e.g., fibers, films and other manufactured articles, to a blue-reddish shade exhibiting unusual fastness to sublimation, light, and to the action of trichloroethylene.

Compounds defined by the above general formula may be obtained by condensing a dinitrodihydroxyanthraquinone and, respectively, a mono or dinitroaniline.

The condensation is carried out using a high boiling solvent, preferably nitrobenzene or α-chloronaphthalene, at a temperature of from about 130 to 210° C., and preferably from about 160 to 210° C.

The molar ratio between the dinitrodihydroxyanthraquinone and the nitroaniline is preferably from about 1:2 to 1:5.

The following examples will further illustrate this invention. All parts are by weight unless otherwise stated.

Example 1

3.3 g. of dinitrochrysazin are heated for 8 hours at 180° C. together with 5.5 g. of metanitroaniline and 20.0 g. nitrobenzene. After cooling, the mass is filtered, washed with minor amounts of $C_2H_5OH$, and the cake is then steam distilled in the presence of 0.5 g. $Na_2CO_3$. The product is washed until a neutral reaction is obtained, and then is filtered and dried, which product is the metamononitroanilide derivative. The foregoing product is used to dye (under pressure, at a temperature of from about 110 to 130° C.) polyethylene-terephthalate to obtain a blue shade having outstanding fastness and resistance to sublimation, light, and to the action of trichloroethylene.

Example 2

By proceeding as described in Example 1, but using dinitroanthrarufin (1,5 - dihydroxy - 4,8 - dinitro-anthraquinone), a dyestuff is obtained having a more reddish shade and very good solidity. Dyeings are obtained having equivalent fastness and resistance to those of Example 1.

Variations can, of course, be made without departing from the spirit of this invention.

Example 3

By proceeding as described in the foregoing examples, but using a corresponding amount of α-chloronaphthalene instead of nitrobenzene and carrying out the condensation at a temperature of about 180–200° C., the same dyestuff is obtained.

Having thus described the invention, what is desired to be secured and claimed by Letters Patent is:

1. A dyestuff having the formula:

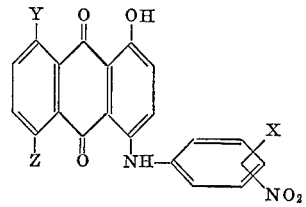

wherein X is selected from the group consisting of hydrogen and —$NO_2$, and Y and Z, each being different from the other, are selected from the group consisting of —OH and —$NO_2$.

2. The dyestuff of claim 1 having the formula:

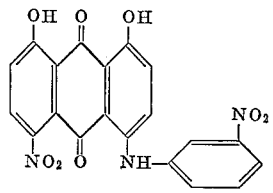

References Cited

FOREIGN PATENTS 1,001,784    1/1957    Germany.

LORRAINE A. WEINBERGER, *Primary Examiner.*

HAROLD C. WEGNER, *Assistant Examiner.*

U.S. Cl. X.R.

8—39